United States Patent [19]
Ward

[11] 3,932,895
[45] Jan. 13, 1976

[54] REVERSIBLE MAGNETIC RECORDING DISK UNIT

[75] Inventor: Paul F. Ward, San Jose, Calif.

[73] Assignee: Information Terminals Corporation, Sunnyvale, Calif.

[22] Filed: Sept. 10, 1974

[21] Appl. No.: 504,792

[52] U.S. Cl. .................. 360/135; 206/62 P; 360/86; 360/97
[51] Int. Cl.² .................... G11B 5/82; G11B 5/012; G11B 23/02
[58] Field of Search .......... 360/135, 133, 86, 97–99; 242/198–199; 274/47; 206/62 P

[56] References Cited
UNITED STATES PATENTS

| | | | |
|---|---|---|---|
| 2,886,330 | 5/1959 | Halftermeyer | 360/135 |
| 3,225,338 | 12/1965 | Kelner et al. | 360/135 |
| 3,475,741 | 10/1969 | Toney | 360/135 |
| 3,668,658 | 6/1972 | Flores et al. | 360/97 |
| 3,678,481 | 7/1972 | Dalziel | 360/97 |
| 3,833,926 | 9/1974 | Hall | 360/135 |
| 3,845,502 | 10/1974 | Paus | 360/97 |

*Primary Examiner*—Alfred H. Eddleman
*Attorney, Agent, or Firm*—Townsend and Townsend

[57] ABSTRACT

An improved magnetic disk unit comprised of a jacket provided with flexible disk coated on both faces thereof with a magnetic material. The jacket and the disk have means thereon for rendering the disk unit compatible with different types of disk drives so that the disk unit is reversible in a particular disk drive to permit storage and readout of information from either face thereof to thereby increase the storage capacity of the disk itself.

4 Claims, 8 Drawing Figures

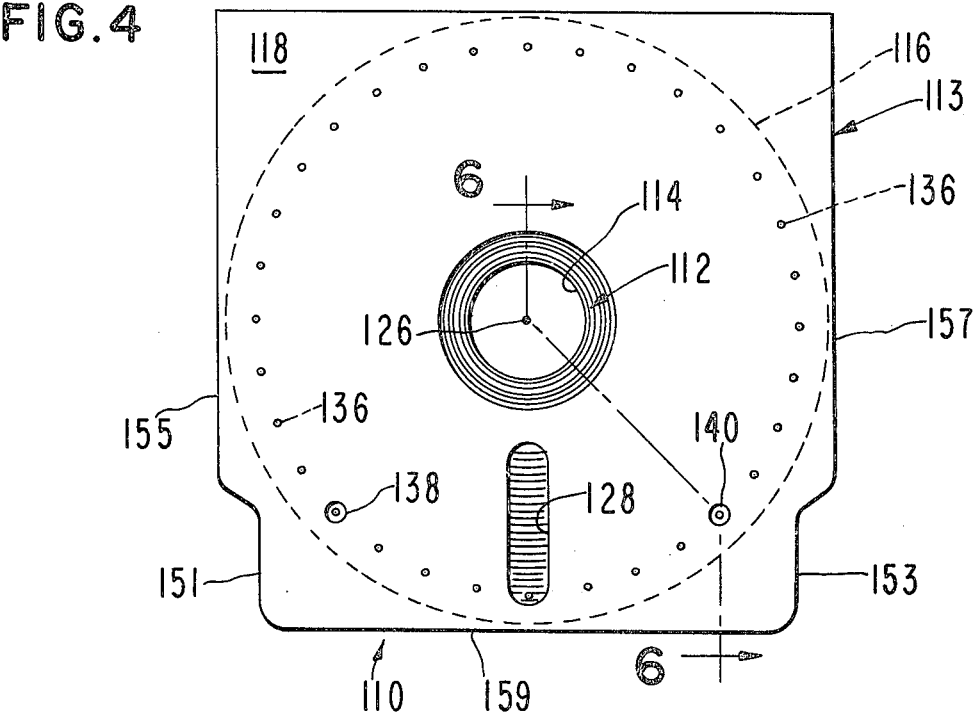
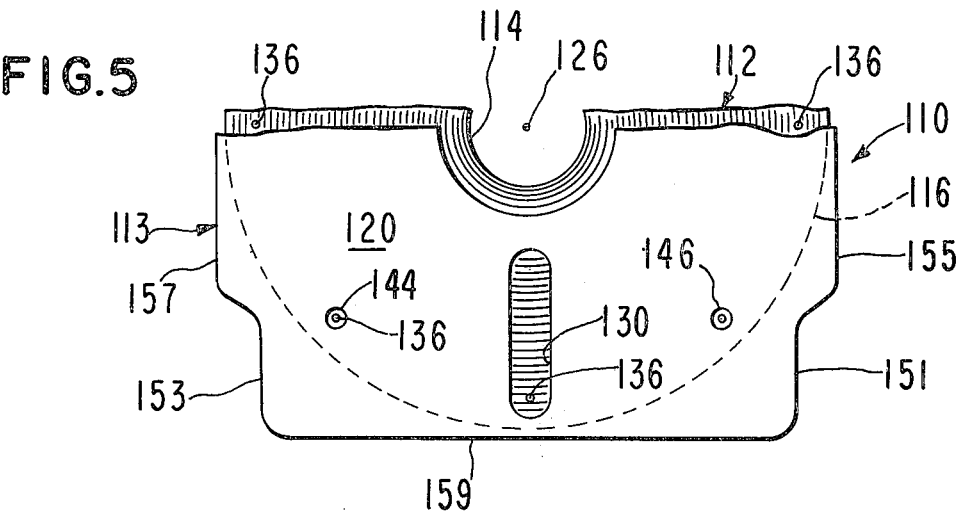
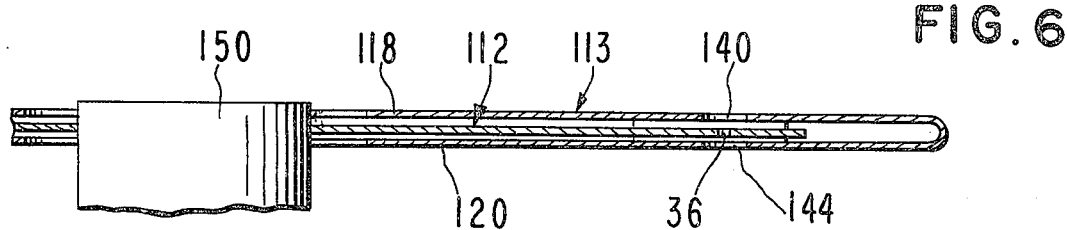

REVERSIBLE MAGNETIC RECORDING DISK UNIT

This invention relates to improvements in magnetic storage media of the type utilizing a flexible magnetic disk of the type known as a "floppy" disk usuable with a disk drive and, more particularly, to a record unit in which both sides of the disk thereof are usuable with conventional disk drives rather than only one side as with presently available disk units.

BACKGROUND OF THE INVENTION

Conventional disk drives utilize a record unit including a disk of flexible material rotatably carried in a jacket and coated on both faces with a magnetic material, yet information in the form of magnetic signals can be written on or read from only one face of the disk because the record unit has no means to permit it to be used in an inverted or reversed position relative to the read-write head of the disk drive. Typically, the record unit has a configuration which renders it compatible with a particular disk drive. There are several U.S. companies which market disk drives; thus, there are several different record unit configurations commercially available at the present time.

The particular means on the jacket and disk of a conventional record unit include a single group of aligned holes through the jacket and the disk for use with a disk rotation sensor, a single slot for use with the read-write head, and possibly a notch or hole in the jacket to provide a write enable function for the corresponding disk drive. The record unit can only be coupled to the disk drive in one way because of the irregular positioning of the hole and notch sensors of the disk drive.

SUMMARY OF THE INVENTION

The present invention is directed to an improved record unit of the type described because it uses additional holes and an additional notch or hole if needed, all of which additional features are in mirror image positions with respect to the corresponding features found in a conventional record unit and also provided with the record unit of the present invention. Thus, the present invention permits the record unit to be reversible so that, after one side of the disk thereof has been used for the storage or readout of information, the record unit can be inverted relative to the disk drive to allow the opposite side of the disk to be used.

In a preferred form of the invention, the jacket of the record unit has two pairs of holes therethrough, each hole pair corresponding to a particular side of the disk and adapted to be placed in alignment with a photosensor for generating triggering signals to be applied to the read-write head of a disk drive as a function of the rotation of the disk within the jacket. The locations of such hole pairs are selected in accordance with the locations of the photosensors of particular disk drives. In addition, the jacket of the record unit of the present invention can be provided with notches or holes at strategic locations to provide a write enable function for the disk drive when the record unit is coupled thereto. Thus, the record unit is reversible in use inasmuch as either side of the disk can be used for storage or readout of information by the read-write head of the corresponding disk drive.

The primary object of this invention is to provide an improved record unit utilizing a flexible disk coated with magnetic material on its opposed faces wherein the disk is in a jacket having means thereon for rendering the same compatible with a particular disk drive notwithstanding the fact that the disk itself is reversible in use to increase its storage capacity over that obtainable with the use of conventional magnetic recording disks.

Another object of this invention is to provide a record unit of the type described wherein the jacket and the disk thereof can be provided with holes, slots, recesses and the like in symmetrical locations with respect to a predetermined reference so that the record unit is reversible to permit both sides of the disk to be available for storage of information thereon.

Other objects of this invention will become apparent as the following specification progresses, reference being had to the accompanying drawings for an illustration of several embodiments of the invention.

In the drawings:

FIGS. 4–6 are views similar to FIGS. 1–3, respectively, but showing another embodiment of the record unit.

Figure 1:
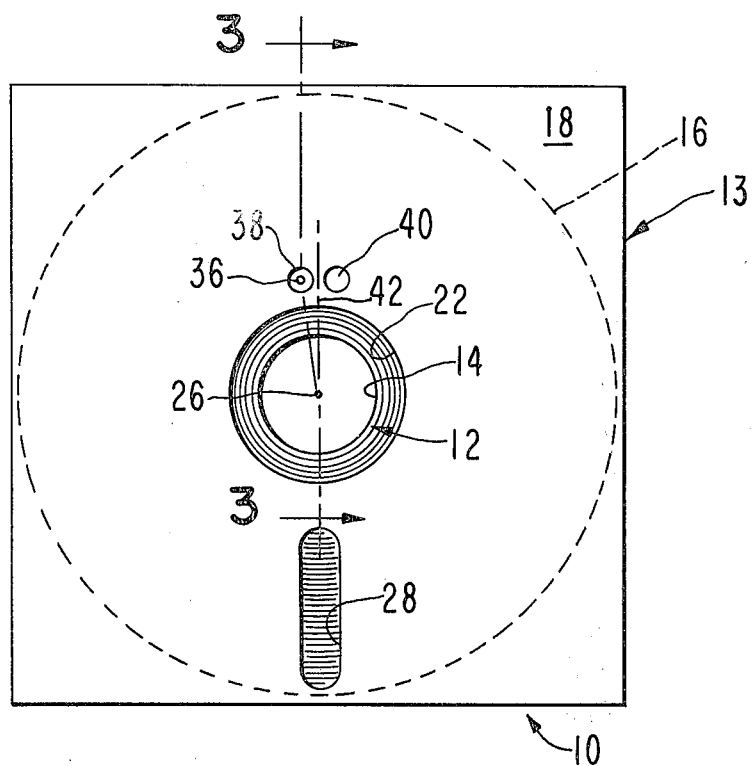
FIG. 1 is a side elevational view of one form of the record unit of this invention.

A first embodiment of the recording unit of this invention is broadly denoted by the numeral 10 and includes a disk 12 disposed within a jacket 13 for rotation relative thereto. Disk 12 has a circular inner periphery 14 and a circular outer periphery 16, and the disk is provided with a coating on each side thereof to permit electrical signals to be magnetically recorded thereon. Disk 12 comprises a conventional floppy disk in that disk 12 has the coatings on opposed sides or faces thereof. Thus, signals can be magnetically written on or read from both sides of the disk.

Jacket 13 has a pair of opposed sides 18 and 20 of generally square configuration. The proximal end margins of sides 18 and 20 are coupled together to confine disk 12 between the sides, yet the disk can rotate within and relative to jacket 13. Sides 18 and 20 have respective holes 22 and 24 therethrough concentric with the center line 26 through sides 18 and 20. Openings 22 and 24 are of essentially the same diameter and this diameter is larger than the diameter of hole 14 through the center of disk 12.

Figure 2:
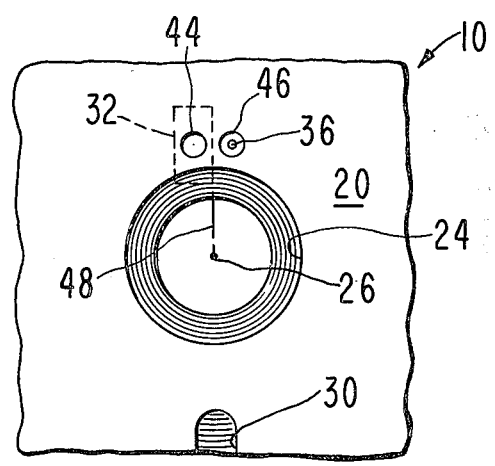
FIG. 2 is a fragmentary view showing the opposite side of the record unit of FIG. 1.

Sides 18 and 20 also have respective slots 28 and 30 therethrough for exposing a slot-shaped portion of disk 12 in the manner shown in FIGS. 1 and 2. Slots 28 and 30 are in alignment with each other and permit a read-write head (not shown) of a disk drive to become coupled to disk 12 for reading information from the disk or writing information thereon. Slots 28 and 30 are radial to center line 26 and permit both sides to be alternately presented to a read-write head.

The read-write head of the disk drive with which record unit 10 is associated is triggered by a pulsor signal from a photosensor 32 when the latter receives a light beam from a light source 34 passing through a hole 36 in disk 12. Photosensor 32 and light source 34 are mounted in any suitable manner adjacent to record unit 10 to provide for the generation of this triggering signal. To permit the triggering of the read-write head regardless of which side of disk 12 is being used, sides 18 and 20 of jacket 13 are provided with holes therethrough to permit alignment of hole 36 of disk 12 between photosensor 32 and light source 34. As shown in FIG. 1, side 18 has holes 38 and 40 which are symmetrically located on opposite sides of a diametral central line 42 radial to center line 26. Also, holes 38 and 40 lie on radial lines emanating from center line 26.

Side 20 is provided with holes 44 and 46 which are also symmetrically located with respect to a diametral center line 48 radial to center line 26. Hole 44 is aligned with hole 40 and hole 46 is aligned with hole 38. The hole pairs are offset with respect to corresponding center lines 42 and 48 because photosensor 32 of a conventional disk drive is offset and in a fixed position as shown in dashed lines in FIG. 2. Thus, in the example of FIG. 2, light will pass through hole 36 and trigger photosensor 32 only when hole 36 is in alignment with holes 40 and 44. For the reverse case, i.e., when record unit 10 is inverted, the hole pair comprised of holes 38 and 46 will become aligned with photosensor 32.

In use, record unit 10 is normally in a vertical plane in a disk drive, the latter having a spindle 50 which is received within hole 14 at the center of disk 12 for rotating the disk relative to jacket 13. When record unit 10 is so mounted, the read-write head (not shown) of the disk drive will be in alignment with the slot of either side 18 or side 20. For instance, if the head is adjacent to slot 30, photosensor 32 will be in the dashed line position of FIG. 2 relative to the hole pairs 38–46 and 40–44. A triggering signal will be generated and applied to the head each time hole 36 becomes physically aligned with holes 40 and 44. Information can then either be read from or written onto the corresponding side or face of disk 12.

Figure 3:
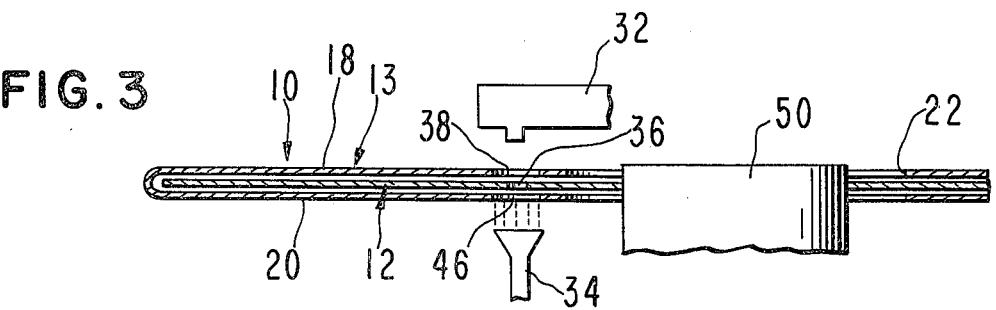
FIG. 3 is a cross-sectional view taken along line 3—3 of FIG. 1.

When the disk is inverted, it is also placed on spindle 50 as shown in FIG. 3 and the opposite side of the disk can be used for reading information from a disk or writing information thereon. In such a case, the read-write head will be adjacent to slot 28 and the hole pair comprised of holes 38 and 46 will be aligned with photosensor 32. In this manner, either side of the disk can be used at any one time so as to essentially double the storage capacity of the disk.

Figure 7:
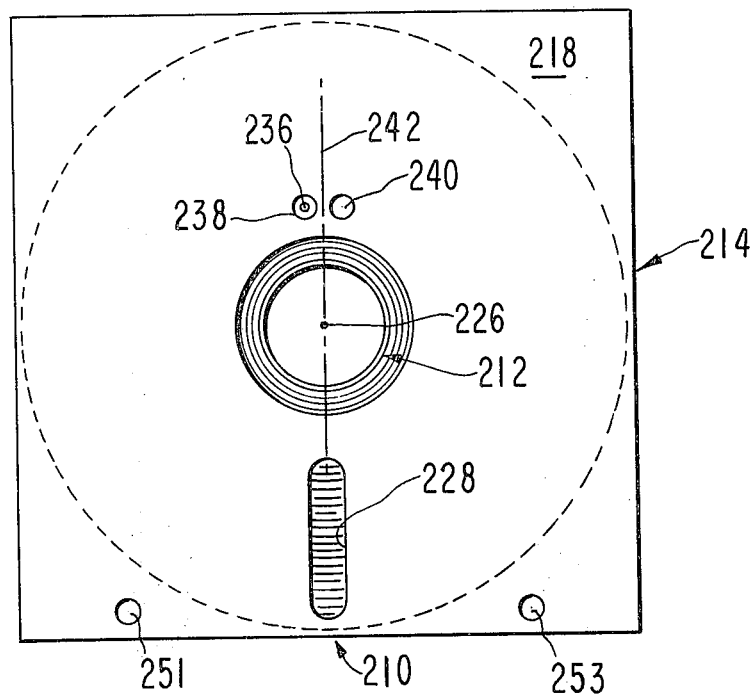
FIGS. 7 and 8 are elevational views of respective sides of a third embodiment of the record unit.
Figure 8:
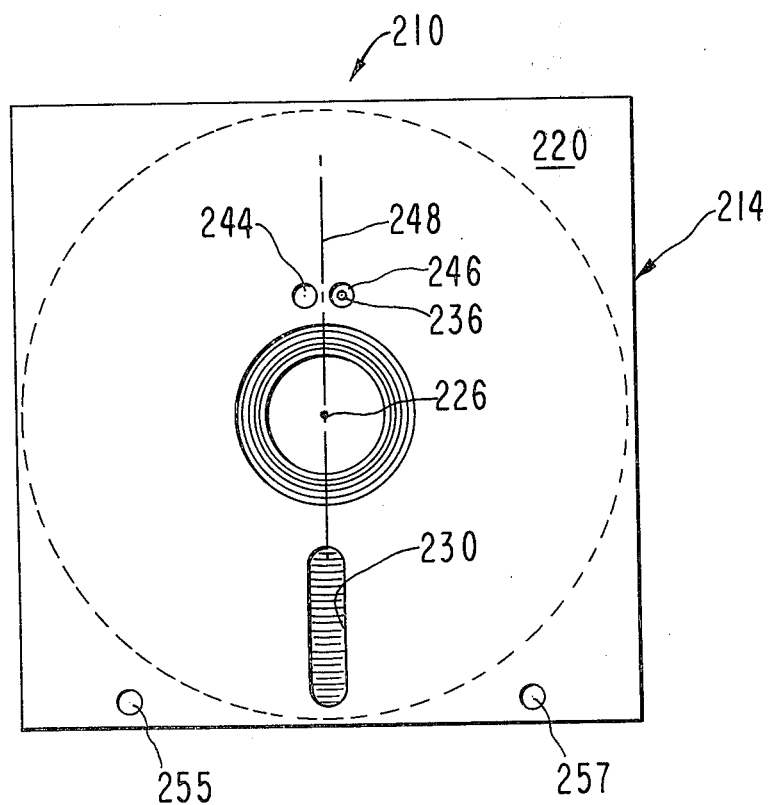

Record unit 10 is of the type compatible with the disk drive marketed by the IBM Corporation. Other disk drives are made by other companies, such as Memorex Corporation, Santa Clara, California, and Shugart Associates, Sunnyvale, Calif. A record unit made in accordance with the present invention and compatible with the Memorex disk drive is shown in FIGS. 4–6, and a record unit made in accordance with the present invention and compatible with the Shugart disk drive is shown in FIGS. 7 and 8.

Record unit 110 of FIGS. 4–6 includes a recording disk 112 mounted within an envelope 113 for rotation relative thereto. Disk 112 has a center hole 114 for mounting on a spindle 150 of a disk drive. The outer periphery 116 of disk 112 is shown in dashed lines in FIGS. 4 and 5.

Jacket 113 is comprised of two sides 118 and 120 having respective slots 128 and 130 for the same purpose of slots 28 and 30 of record unit 10. Slots 128 and 130 are radial to the center line 126 of record unit 110.

Sides 118 and 120 have aligned hole pairs therethrough to permit alignment of a photosensor (not shown) and a light source (not shown) with a series of circumferentially spaced holes 136 through disk 112 near its outer periphery 116 as shown in FIG. 4. Side 118 has holes 138 and 140 symmetrically located on opposite sides of slot 128. Similarly, side 120 has corresponding holes 144 and 146 symmetrically located with respect to slot 130. Hole 146 is in alignment with hole 138 to form a first hole pair and hole 144 is in alignment with hole 140 to form a second hole pair. The photosensor and light source in a disk drive with which record unit 10 is to be used is offset laterally with respect to either of slots 128 and 130; thus, this explains why the aforesaid hole pairs are located as they are. Moreover, the function of holes 136 is to cause the photosensor to generate a triggering signal for the read-write head (not shown) of the disk drive as disk 112 rotates.

Jacket 113 has also a pair of notches or recesses 151 and 153 in the side margins 155 and 157, respectively, near the end margin 159. These notches are provided for a write enable function of the disk drive and are also located symmetrically with respect to slots 128 and 130.

In use, record unit 110 is inserted into the disk drive, typically in a vertical plane. In such a case, one or the other of slots 128 and 130 is adjacent to the read-write head of the disk drive. In such a case, the photosensor and light source for triggering the head will be adjacent to a particular hole pair, such as the pair including holes 140 and 144. Furthermore, one of the two notches 151 and 153 will operate to effect a write enable function of the disk drive while the other notch is inoperable for any function. When properly positioned with respect to the disk drive, spindle 150 thereof will be received within the central hole 114 of disk 112.

As the disk rotates, holes 136 successively pass the hole pair aligned with the photosensor and light source. This causes signals to be generated by the photosensor which are directed to the read-write head to effect either a reading or a writing function.

When it is desired to either read or write on the opposite face of disk 112, record unit 10 is inverted on spindle 150 and the disk is rotated within jacket 113 as before. This time, the read-write head will be adjacent to the other of the two slots 128 and 130 and the other of the two notches 151 and 153 will be performing the write enable function. Also, the other hole pair, such as the pair including holes 138 and 146 will be aligned with the photosensor and light source. Thus, it is possible to use either side of disk 112 for recording and playback of information.

Record unit 210 shown in FIGS. 7 and 8 and compatible with the disk drive of Shugart Associates is of essentially the same construction in all respects as record unit 10 (FIGS. 1–3) except that record unit 210 has a second set of hole pairs to provide a write enable function for the disk drive. To this end, record unit 210 includes a disk 212 mounted within and rotatable relative to a jacket 214 of generally square configuration. Disk 212 has a hole 236 therethrough for the same purpose as hole 36 of record unit 10 (FIGS. 1–3). Jacket 214 has sides 218 and 220, side 218 having holes 238 and 240 therethrough and side 220 having holes 244 and 246. Holes 238 and 240 are located on opposite sides of and symmetrical to a diametral center line 242 passing through the center line 226 of record unit 210. Similarly, holes 244 and 246 are on opposite sides of and symmetrical to a diametral center line 248 also passing through center line 226. Hole 246 is aligned with hole 238 and hole 244 is aligned with 240. Hole pairs 238–246 and 240–244 are provided for the same purpose as hole pairs 38–46 and 40–44 of record unit 10.

Sides 218 and 220 have respective slots 228 and 230 for the same purpose of slots 28 and 30 of record unit 10. Slots 228 and 230 are aligned with each other and are radial to center line 226.

Side 218 has two holes 251 and 253 near one margin of the jacket as shown in FIG. 7 adjacent to slot 228. Holes 251 and 253 are symmetrically located on opposite sides of center line 242.

Similarly, side 220 has a pair of holes 255 and 257 therethrough at locations symmetrical to and on opposite sides of center line 248. Hole 257 is aligned with hole 251 and hole 255 is aligned with hole 253. These hole pairs are formed in record unit 210 to provide a write enable function for the read-write head of the disk drive with which record unit 210 is used.

Record unit 210 is used in the same manner as described above with respect to record unit 10 except that record unit 210 provides for the write enable function mentioned above. Record unit 210 can be used in a manner such that information can be read from or written onto either face or side of disk 212, thereby essentially doubling the storage capacity of the disk relative to conventional disks.

In each of the foregoing embodiments, a liner (not shown) is disposed between the disk and the inner surface of each jacket side, respectively. Also, disk 212 has typically thirty-three holes 236 although only one such hole is shown in FIGS. 7 and 8.

I claim:

1. A reversibly mountable magnetic record unit for a disk drive having a sensor for controlling information transfer to and from a selected side of a planar recording media comprising: a flexible circular planar disk having a pair of opposed faces, a central axis, a central circular opening and a hole through said disk radially spaced from said central axis, there being a coating of magnetic recording medium on each of said faces, whereby information in the form of magnetic signals can be magnetically read from and written onto either of said faces; a jacket, said disk being disposed within the jacket and being rotatable relative thereto, said jacket having a pair of opposed sides, each jacket side having a central circular opening and a pair of holes spaced from the central opening and symmetrically located relative to a diametral center line therethrough, said jacket being symmetric about said diametral center line, the holes of one jacket side being aligned with respective holes of the other jacket side to form two aligned hole pairs equidistant from said diametral center line, the hole in the disk being movable past and into successive alignment with each aligned hole pair to actuate the sensor when the jacket is in an operative position relative to the disk drive, each jacket side further having a slot therethrough radially aligned with said central opening and with each other along said diametral center line for permitting information to be magnetically transferred to and from a single selected face of the disk, said magnetic record unit being mountable to the disk drive in an obverse and a reverse position about said diametral center line.

2. A magnetic record unit as set forth in claim 1, wherein each jacket side has a second pair of holes symmetrically located relative to the diametral center line between the corresponding first pair of holes, each second hole of one jacket side being aligned with a respective second hole of the other jacket side to form a hole group therewith to provide a write enable function for the disk drive when said jacket is in said operative position.

3. A magnetic record unit as set forth in claim 2, wherein the first and second pairs of holes of each jacket side are on one side of the corresponding central opening.

4. A jacket for a reversible magnetic recording disk having a magnetic coating on each of the opposed faces thereof, said jacket including a pair of flexible opposed sides having means for connecting the outer peripheral margins thereof together when the disk is therebetween and rotatable relative thereto, each side having a central circular opening, a slot extending radially from and being in spaced relationship to the central opening, a pair of spaced holes symmetrically located on opposite sides of a line coincident to the radial line on which the slot is disposed, the slot and holes of one side being aligned with the slot and respective holes of the other side, and a pair of recesses symmetrically located relative to said radial line and mating with respective recesses of the other side for permitting the reversible mounting of said recording disk contained therein.

* * * * *